March 11, 1924.

W. ROECKER 1,486,686

DOUGH PUNCHING AND FOLDING MACHINE

Filed May 2, 1923  2 Sheets-Sheet 1

INVENTOR.
William Roecker,
BY
Geo. P. Kimmel, ATTORNEY.

March 11, 1924.
W. ROECKER
1,486,686
DOUGH PUNCHING AND FOLDING MACHINE
Filed May 2, 1923       2 Sheets-Sheet 2
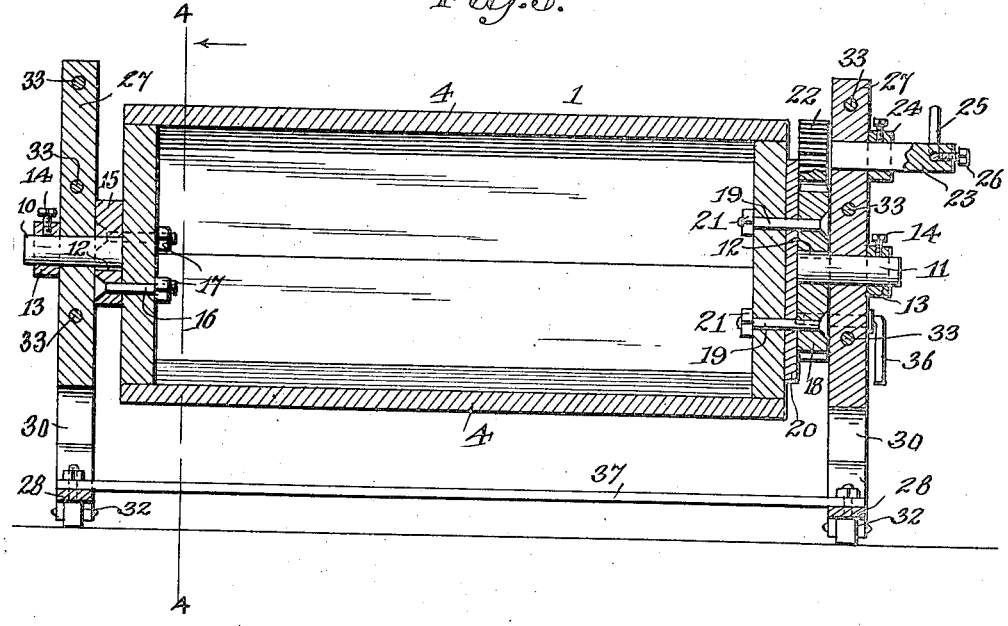
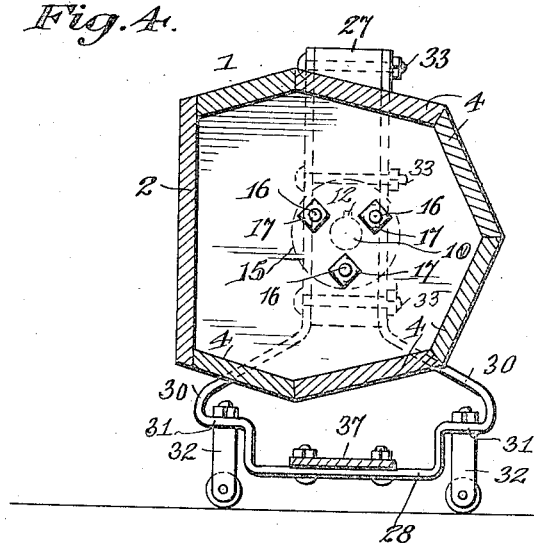
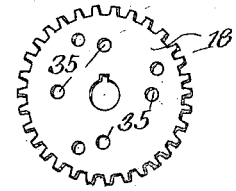
INVENTOR.
William Roecker,
BY
Geo. P. Kimmel, ATTORNEY.

Patented Mar. 11, 1924.

1,486,686

UNITED STATES PATENT OFFICE.

WILLIAM ROECKER, OF MARION, OHIO.

DOUGH PUNCHING AND FOLDING MACHINE.

Application filed May 2, 1923. Serial No. 636,249.

*To all whom it may concern:*

Be it known that I, WILLIAM ROECKER, a citizen of the United States, residing at Marion, in the county of Marion and State of Ohio, have invented certain new and useful Improvements in Dough Punching and Folding Machines, of which the following is a specification.

This invention pertains to dough folding and punching machines, and has for one of its objects the provision of a machine which will more thoroughly punch and knead the dough than it is possible to do by hand.

In the operation of the machine, the dough carrying trough is given an oscillatory or a rocking or semi-rotary motion thus throwing the dough from one side to the other causing it to double and fold on itself, entrapping air between the folds and thus producing a light bread. The rocking motion may be done either manually or by machinery, according to the size of the apparatus.

By referring to the accompanying drawings, a clearer and more intelligent understanding of the device may be had.

In the drawings:—

Fig. 3 is a vertical longitudinal section of Fig. 1.

Fig. 4 is a cross sectional view on the line 4—4 of Fig. 3.

Fig. 5 is a detail view of one of the gears.

Like reference numerals refer to like parts in each of the several views of the drawings.

Figure 1:
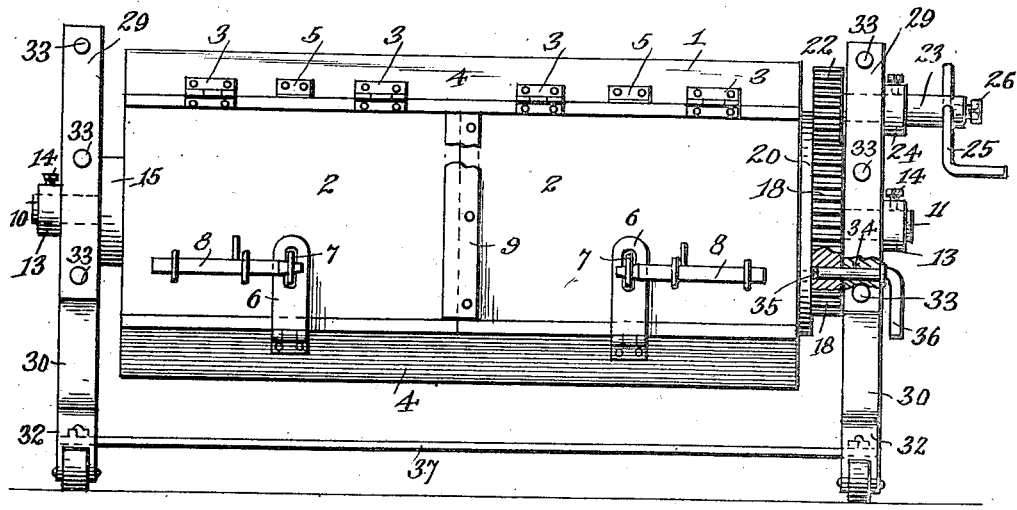
Figure 1 shows a side elevation of the machine with the trough turner one-fourth of a turn to show the top thereof.
Figure 2:
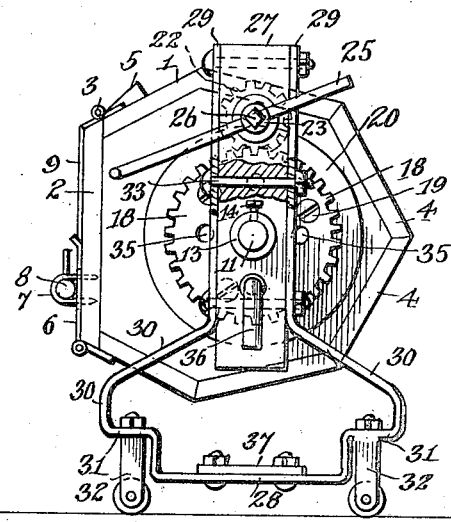
Fig. 2 is an end elevation thereof, parts of which are in section.

The mixing chamber as shown is a trunnioned receptacle of polygonal contour and is indicated as a whole by the numeral 1. Access is had to the interior of the receptacle through the lids or closures 2, 2 which are connected to the body of the receptacle by hinges 3. As shown the closure 2 is of greater width than the sides 4. Located between the hinges 3, are stops 5, which serve to support the closure members when the same are opened.

Attached to the front of the receptacle are a pair of hasps 6, one of the shiftable sections of each overlapping each of the lids 2 and the slots therein encircling an eye 7 mounted on each of said lids. A slidable bolt 8, carried by each of the lids is adapted to pass through the eye 7 when the shiftable section of the hasp is down thus locking the lids in closed position.

A cover strip 9 is carried by one of the lid members to cover the joint between the two lid members.

Mounted on either end of the receptacle 1, are trunnions 10 and 11 each of which carries a key 12 at its inner end and at its outer end a collar 13, each collar being held in engagement with its respective shaft by screws 14, 14.

The inner or keyed end of the trunnion 10 terminates in a collar 15, which is securely bolted to one end of the receptacle 1, by bolts 16 which have their heads countersunk flush with the outer side of said collar, the shank passing through the collar and the end of the receptacle and terminating therein in the nuts 17. The keyed end of the other trunnion 11 terminates in a large gear 18 which is securely bolted to the other end of said receptacle by bolts 19, the heads of which are countersunk in the outer surface thereof, the shanks passing through the gear, through a leather disk 20, interposed between the gear and the receptacle, and through the end of the receptacle and terminating therein in nuts 21.

The disk 20, is of greater diameter than the gear 18, and serves to space the latter from the end of the receptacle.

Meshing with the gear 18, at its upper side is a pinion 22, carrying a shaft 23, carrying near its center a screw set collar 24 and at its outer end is provided with a transverse opening through which is passed a crank handle 25, which is held from slipping by a screw pin 26, extending in from the end of the shaft.

The trunnions 10, 11 and the shaft 23, are mounted in and pass through bearing blocks 27, which are of rectangular shape and are each supported in a vertical position by the contracted upper portions of a skeleton frame member of peculiar contour.

The aforementioned collars 13, 13 and 24 are mounted outside the bearing blocks 27 on their respective shafts for the purpose of preventing side play.

Each of the frame members 28, as shown, consists of a single band of suitable material having a contracted upper portion formed by bringing the ends 29 of the band together and an enlarged lower portion 30, having insets 31, which are formed as the result of shaping the lower side of the enlarged portion to provide the depending central portion 28', the sides of which terminate inwardly of the widest part of said lower portion. In these insets the roller carrying brackets 32 are mounted, one on each side of the portion 28'.

The bearing blocks 27, are supported in position between the ends 29, of the frame members 28 and held securely therebetween by bolts 33 as shown.

Beneath the bearing 11, in the block 27, is provided an opening 34, with which a series of corresponding openings 35 in the gear 18 are adapted to be aligned. A pin 36 is provided for insertion in the aligned openings for the purpose of locking the gear and thus securing the receptacle 1, against movement when the same is being charged with a batch of dough.

A brace 37, mounted beneath and extending longitudinally of the receptacle, connects the frame members 28 thus steadying and strengthening the structure.

Having thus described the invention in accordance with the accompanying drawings, it is to be understood that various changes and modifications may be made in the same without departing from the spirit of the invention as claimed.

What I claim is:—

1. In combination, a pair of opposed vertical skeleton supports, a rectangular bearing block secured within the upper portion of said supports, receptacle bearing trunnions extending into said blocks intermediate the ends thereof, a power shaft mounted in one of said blocks, a pinion carried on the inner end of said shaft, a gear moving with one of the trunnions and meshing with said pinions, and means extending through one of the blocks and engaging the gear to lock the trunnions.

2. In combination, a pair of portable skeleton supporting members each having an enlarged lower portion and a constricted upper portion, said upper portion being centrally disposed with respect to the lower portion, said lower portion further being formed at its lower side to provide a depending portion inset at each side from the side of the lower portion, vertical roller carrying brackets secured to the lower side of said lower portion adjacent each end of said depending portion, and means arranged between the constricted upper portion of each of the members for revolubly supporting a receptacle.

In testimony whereof, I affix my signature hereto.

WILLIAM ROECKER.